Nov. 24, 1964 W. L. GORE 3,158,181
POLYMERIC TUBATE PRODUCT AND PROCESS
Filed May 11, 1959 2 Sheets-Sheet 1
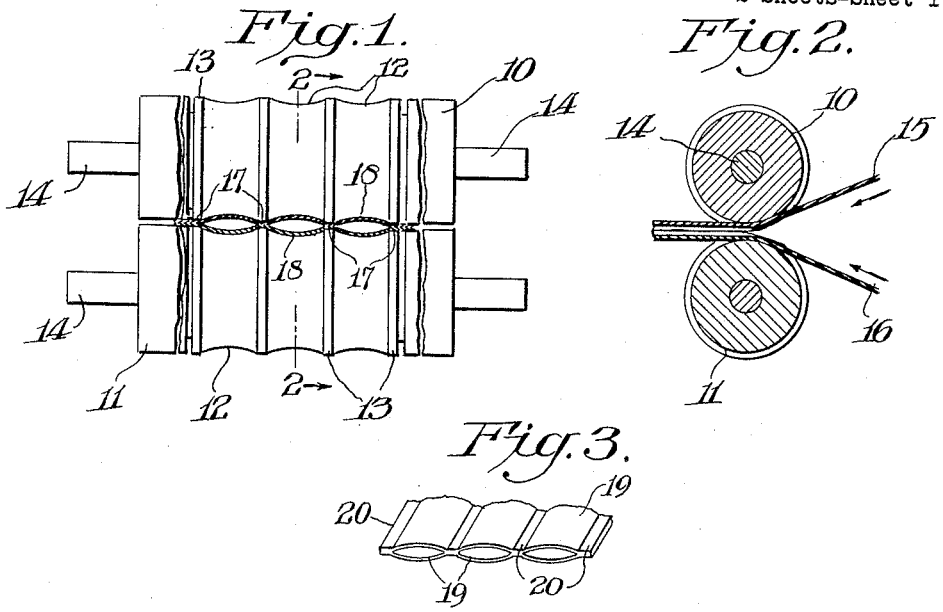
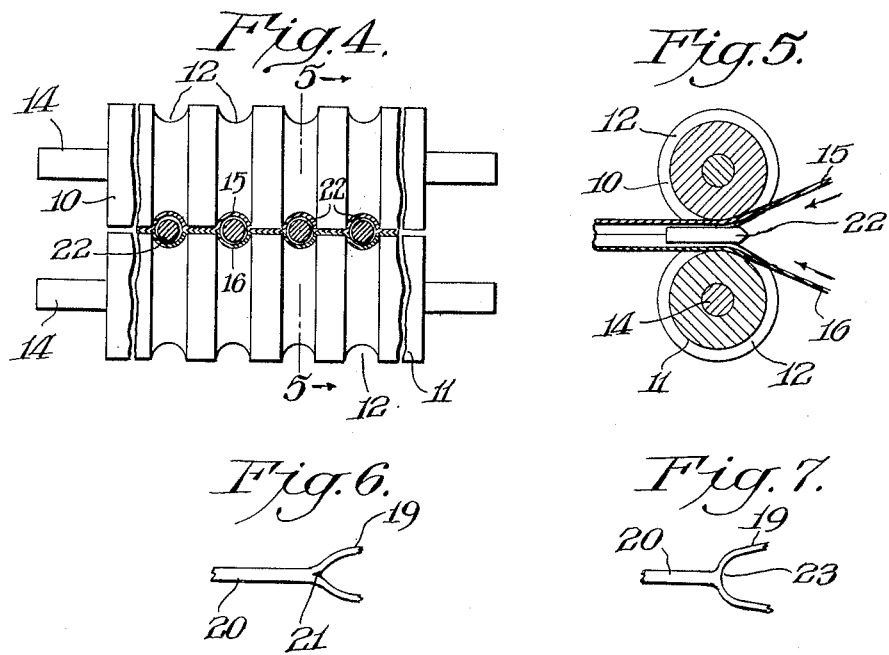
INVENTOR
Wilbert L. Gore
BY
ATTORNEY Nov. 24, 1964   W. L. GORE   3,158,181
POLYMERIC TUBATE PRODUCT AND PROCESS
Filed May 11, 1959   2 Sheets-Sheet 2
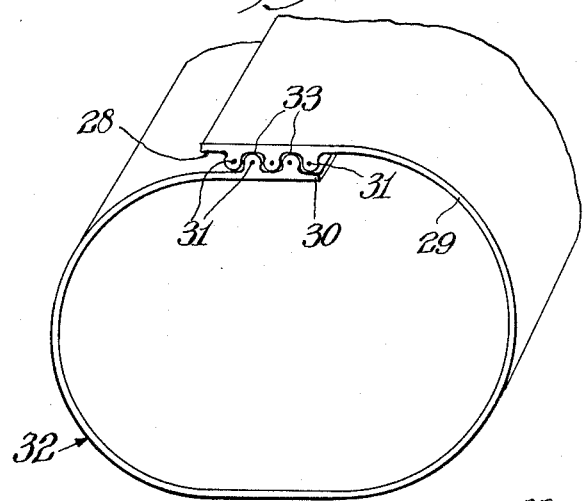
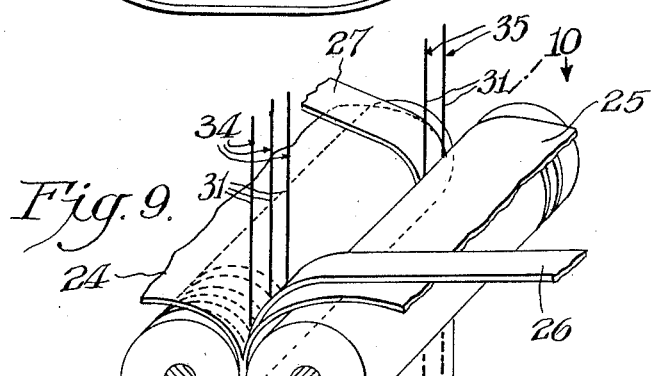
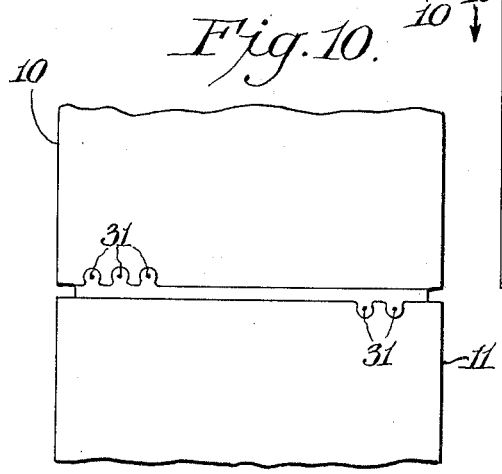
INVENTOR
Wilbert L. Gore
BY
ATTORNEY

United States Patent Office 3,158,181
Patented Nov. 24, 1964

3,158,181
POLYMERIC TUBATE PRODUCT AND PROCESS
Wilbert L. Gore, Newark, Del., assignor to
W. L. Gore & Associates, Inc.
Filed May 11, 1959, Ser. No. 812,314
6 Claims. (Cl. 138—168)

This invention relates to the provision of enclosures made of fluorocarbon resins. More particularly, it relates to such items as envelopes and tubes made from a tetrafluoroethylene resin.

Tubes of tetrafluoroethylene resin may be made by extruding a lubricated composition of the resin through a circular annulus to form the tube, evaporating the lubricant and then sintering the tube. It is difficult to center the mandrel in the die to form a uniform annulus; as a result large variations in wall thickness are found in the product. Also, it is not feasible in this process to reduce the wall thickness of the tubes below about 0.010 inch and even these thicknesses can be attained only with tubes having inside diameters below about 0.10 inch. Prior art processes for making tubes and similar closures of polytetrafluoroethylene are further limited in that only single tubes can be made.

Thus, an object of this invention is the provision of closures made from fluorocarbon polymers such as polytetrafluoroethylene. Another objective is the provision of protective coverings, containers, envelopes and the like by a continuous method and with uniformity in production. A further objective is the production of a multiple assembly of tubes. A still further purpose is the provision of such articles as described above which are unsymmetrical in shape. Other objects appear hereinafter.

The objects of this invention are accomplished by passing unsintered sheets of the fluorocarbon into the bite betwen two opposing rollers that are, in effect, corrugated. On either side of a valley or depression in each roll is a ridge and the two rollers are arranged so that the ridges of one are aligned to press against the ridges of the other. The sheets are thus, pressed together at the ridges. The pressing is done in a manner to effect compressing the sheets together making them flow laterally to edges of the ridges. If the compression-flow is great enough, strong adhesion is obtained in the pressed areas, and the resultant article, which comprises a web/tube/web structure or a plurality of such structures, is then heated to a temperature at least equal to the sintering temperature of the polymer. Coalescence follows and the entire unit is converted into a homogeneously sintered article. Little or no adhesion of the sections of the structure forming the walls of the closure occurs. When tubes are prepared, they present a ready covering for such items as wire, and since they lie flat when empty, they can be shipped very readily. Bulk is at a minimum.

For further understanding of the various closures and the process and equipment of this invention, reference is made to the figures of which:

FIGURE 1 is a side elevation, partly in section, of the rolls of this invention showing their contour, the grooves and ridges and position of sheets being processed;

FIGURE 2 is a sectional taken on 2—2 of FIGURE 1 and showing the converging sheets;

FIGURE 3 is a perspective of an article of this invention;

FIGURE 4 is a side view of rolls of this invention including a guide or forming core;

FIGURE 5 is a sectional view taken on 5—5 FIGURE 4 and showing the sheets converging about the core;

FIGURE 6 shows the type of seal obtained in the absence of the core;

FIGURE 7 illustrates the type of seal that results when the core shown in FIGURE 4 is used;

FIGURE 8 is a view of a tubular article of this invention containing interlocking elements;

FIGURE 9 is a perspective showing the making of an interlocking tubular article; and FIGURE 10 is taken on line 10—10 of FIGURE 9.

As shown in FIGURE 1 roll 10 and roll 11 each contain grooves 12 and ridges 13. These are indexed so that as the rolls rotate a ridge on one roll contacts or may be made to contact the ridge on the other roll with which it is aligned. The rolls are driven through an axle or axles 14 by a motor (not shown). One roll may surface drive the other or two synchronous motors may be used each driving a roller. Any suitable driving means may be employed.

At least two sheets of the fluorocarbon resin 15 and 16 are passed to the nip. Those sections of the sheet meeting at the ridge areas 17 are pressed while those sections converging in the grooved areas are not. For convenience in FIGURE 1 the two sheets in the grooved areas are shown in a separated or tubular form at 18. In the absence of separating means in the groove areas the sheets pass through these areas lying close together. At the areas where the sheets have been pressed tight bonding is effected and the article shown in FIGURE 3 is produced.

This article comprises a series of tubes 19 separated by webs 20. The sheets in the web at this stage can be separated only with difficulty. In the unsintered state the tube/web structures are very durable and they may be shipped, stored, handled and used in processes without damage or without breaking the seals in the webs. The assemblies may also be slit to separate the tubes into individual, durable unsintered tubes which may be similarly handled. The unsintered article is then heated to a temperature at least equal to and usually a bit above the sintering temperature of the resin of which it is composed. Since polytetrafluoroethylene is the resin of most and particular interest, possessing, as it does, the desired crystalline properties, this invention is concerned mainly with it. The sintering is effected without the application of pressure, the articles being heated at or around atmospheric pressure. Molding techniques or the application of external pressure are not required. In sintering, as for example, with polytetrafluoroethylene, the assembly is passed through an oven where it is heated to about 330° C. or above. At 330° C., the entire resinous material coalesces into a homogeneous film. At the webs 20 the sheets become one. It is impossible to separate them into the separate sheets. The seal is very tight and strong. As the assembly goes through the oven the tubes 18 are open, and no sealing together of the sheets occurs in these areas. Occasionally minor adhesions of the tube walls occur, but these are readily broken loose by applying air pressure inside the tubes to distend them. Normally, this procedure is not needed.

The contour of the tube near the seal in the tube can be seen in FIGURE 6. There is formed an amount of material at 21 which appears about as shown and the tube 19 has an oval shape. In other words, the tube walls taper toward the seal. The assemblies having these shapes are very satisfactory in all respects.

If it is desired to produce a rounded structure, the apparatus shown in FIGURES 4 and 5 is used. A stationary guide 22 is positioned in the groove area, and the sheets 15 and 16 are passed to the nip on opposite sides of the guide or mandrel so that they surround the mandrel. Thus, as the sheets go through the rollers they are distended or forced outwardly and they tend to or do take on the contour of the depressions 12 in the rolls.

The bit of polymeric material that is forced toward the grooves by the pressure applied on the sheets in between the ridges is uniformly spread out, and a smooth, round joint is made.

This is shown in FIGURE 7. There it can be seen that the tube walls are well rounded at 23 and there is no accumulation of material in one spot. The material is uniformly distributed. This assembly has certain advantages over that produced without the guide. For example, the walls stay separated or tend to separate more readily. Even though the assembly easily lies flat for shipping purposes, the walls on unpacking separate quickly, and insertion of articles in the tubes is deftly made. The seal of the tube shown in FIGURE 7 is even stronger than that of FIGURE 6.

The invention will be further understood by reference to the examples below which are not limitative but are given for illustrative purposes only.

*Example I*

Two sheets or tapes of unsintered tetrafluoroethylene resin 0.005" thick and 50' long were laid together and the sandwich was passed between two opposing cylindrical rolls having indexing ridges 0.025" wide, spaced 0.455" apart, and raised 0.025" above the surface of the roll cylinders. Where the ridges come together in the bite of the rolls the two sheets were pressed together so that the combined thickness of the two sheets was reduced from 0.010" to about 0.003". The pressure used in this invention is such that the thickness of the web is less than the combined thicknesses and preferably is equal to or less than two-thirds of the combined thicknesses of the initial sheets. This pressing action of the roll ridges makes a seal in the sheets that holds them tightly together so that the assembly can be bent and handled without breaking the seals. The seals formed flat envelopes or tubes that extend along the 50' length of the two sheets.

The sealed assembly was then passed through an oven heated to 380° C., exposing the material to this temperature for about two minutes. The tetrafluoroethylene polymer coalesced during this treatment to form a tough transparent set of tubes. The material appeared to be homogeneous where the sheets were pressed together, and the tubes were open although collapsed to a flat configuration to some extent.

The tubes were slit apart and tested by blowing them up with 35 p.s.i. of air pressure. No ruptures were produced by this pressure. The inside diameter of the tubes was found to be about 0.260" as measured by cylindrical plugs, and the wall thickness of the sintered tubes was about 0.005".

One of the tubes was threaded over a bare wire (size AWG 12) and the covered part of the wire immersed in a 3% salt solution. A potential of 2500 volts was established between the conductor and salt bath. No current flowed through the walls of the tube. Therefore, there were no pores or crevices in it.

*Example II*

Two sheets or tapes of unsintered tetrafluoroethylene resin 0.015" thick and 50' long were guided on each side of a set of four mandrels suspended so they hung into the openings formed by grooves cut into the surface of two opposing cylindrical rolls. The semi-circular grooves were 0.100" in diameter and the four cylindrical mandrels were 0.070" in diameter. The ridges between the grooves were 0.025" wide and the mandrels were set .125" apart so they hung well-centered in the 0.100" diameter circles formed by the grooves at the bite of the rolls. The rolls were rotated so that the two sheets were pulled around the mandrels, pressed together by the ridges between the grooves, and passed between the two rolls. The unsintered polytetrafluoroethylene resin sheets were formed by this treatment into round tubes or cylinders held together by webs about 0.005" thick and 0.025" wide.

This assembly was passed through a 380° C. oven as in Example I. Again the resin was fused into a homogeneous material. The tubes were cylindrical rather than eliptical envelopes as in the previous example. Their inside diameter was about 0.055" and the wall thickness about 0.013".

A 2' length of the tube assembly was cut from the 50' length, draped into a pan of 3% salt water with the ends of the tubes raised above the edges of the pan. The tubes were filled with salt water and a bare wire inserted into each of them so that one end was touching the salt solution inside the tubes. A 3000 volt potential was applied between the wires and salt solution inside the tubes and the salt solution in the pan. No current passed through any of the tubes, proving there were no pores or crevices or cracks in them.

*Example III*

Part of the center of a bar of brass was milled out to form a rectangular recess about 1" wide and 2" long. The ridges surrounding the recess were about 0.050" wide. Two layers of unsintered polytetrafluoroethylene sheet 0.005" thick were laid over the recess, a flat piece of steel plate was placed over the top of the sheets and pressure was applied until the thickness of the sheets where they were pressed against the ridges was reduced to about 0.003". The top plate was removed and the resultant polytetrafluoroethylene structure was lifted from the square recesses. A rectangular envelope had been formed by the pressure against the ridges around the edges of the recess. The envelope was sintered by placing it in an oven at 360° C. After cooling, the envelope was cut out from the assembly by cutting along the middle of the seals with a pair of scissors. One corner of the envelope was snipped off and the envelope blown out by air pressure. The seals appeared to be strong and tight. Concentrated nitric acid was poured into the envelope. No leaks or attack was observed after letting the filled envelope sit overnight.

*Example IV*

In another experiment two main sheets and two auxiliary sheets or strips of unsintered polytetrafluoroethylene resin were passed through the apparatus of this invention to produce a structure having three tubes at one end thereof and two tubes at the other end thereof. This is shown in FIGURE 9. Wide sheets 24 and 25 spanning the ridged areas of the pressure rolls 10 and 11 are simultaneously fed to the nip. Roll 10 has 3 grooves at one end, the area opposite on roll 11 being smooth. Roll 11 at the other end has 2 grooves, the area at that far end on roll 10 being smooth. If filling material is needed auxiliary strips can be fed. For example, strip 26 may be fed into the nip at the 3-groove area as shown while strip 27 is fed at the 2-groove area. Thus, an article having 3 tubes at one end and on the opposite side 2 tubes is produced. The webs are a short web 28, a long web 29 extending between the innermost of the tubes of the two sets and web 30 at the opposite end. As shown in FIGURE 8 each of the tubes was threaded with a metallic wire 31 and the resin was sintered. The dimensions of the tubes and wire were such that upon sintering each wire was embedded in polymer and became bonded in part of the article. The shrinkage of the polymer during sintering reduced the thickness of the protuberance below the wire insert so that the portion containing the wire was relatively somewhat enlarged. This knob is essential to the interlocking action of the protuberances.

As explained, the placement of the tubes and wires were such that the two groups at the ends extended oppositely from the main web 29 as shown in FIGURE 8. Thus, the assembly could be rolled into a tubular element 32. The wires 31 in each of the tubes are fixed in position, the tubes having been converted to solid protuberances comprising the wire 31 and the polymer around it. The webs 33 in between the tubes now form with the protuberances recesses in which the co-acting protuberances fit in an interlocking arrangement. The structure 32 can be produced in any lengths desired, and, of course the elements can be produced separately and sliding fasteners can be readily made. If desired the wires 31 may be fed along with the sheets and strips as shown by the group of 3 lines 34 and the group of 2 lines 35 in FIGURE 9. Metallic wires are most frequently used but other inserts, filling agents or members may be used. Rods or mono- or poly-filaments of fibrous material of various kinds can be used instead of wires, and if desired the tubes can be filled with synthetic resins of the same or different kind. Inorganic materials such as glass also may be used. Sintering effects the bonding and coalescing in these instances also. In all cases sliding fasteners provide ready closure and opening of the interlocked tube.

From the above examples it is seen that tubular articles of various kinds, symmetrical or asymmetrical, can be produced by the process and apparatus of this invention. The die-pressing can be carried out with dies having engraved recesses of any desired shape in one or both of the opposing pressure elements whether those elements be rolls or stationary elements. It is also possible to produce envelope structures having three sealed areas or container structures having flat circular, square, rectangular or the like bottom surfaces. Irrespective of the shape and size of the structures of this invention they may be sintered in a continuous fashion, no external pressure being required during the heating. The finished articles are tough and durable.

The tubes of this invention are adapted to receive inserts, as, for example, one or a plurality of conductor wires. These wires may be separately covered and color-coded. The conductors are readily kept insulated from each other. Thus, a number of conductors may be very simply carried from one terminal connection to another some distance away. Labor in stringing out hook-ups is materially reduced. The problems of stringing up in small passageways, identifying leads and the like are reduced to a minimum.

If great assurance is required that no electrical flaws exist in the construction, several sheets of material can be guided into the rolls on each side of the conductors. For example, the feeds going in may comprise two tapes one on top of the other, instead of the single tape or sheet. There is little possibility that any flaw in one of the sheets will occur exactly indexed with a flaw in the other sheet or sheets. Thus, prior to processing into the articles of this invention, sheets may first be sandwiched together on smooth pressure elements. This does not impair the bonding, for when two sheets, each of which is made up of two sheets pressed together, are processed the usual tight, unsintered bonds are produced.

The resinous materials which may be processed by this invention include tetrafluoroethylene copolymers containing only minor amounts of co-monomers, as, for example, 1–2% of the co-monomer, such copolymers being tetrafluoroethylene/monochloro - trifluoroethylene polymer and tetrafluoroethylene/hexafluoropropylene, among others. The preferred polymer is polytetrafluoroethylene, and the polymers used in this invention must possess the physical and crystalline characteristics of unsintered polytetrafluoroethylene. Conventional thermoplastic resins are inapplicable in the process of this invention. The polymers used are unsintered tetrafluoroethylene polymers having the physical properties of polytetrafluoroethylene and being capable of being pressed in sheet form into sections having a thickness less than the combined thickness are preferably at least as low as two thirds the combined intial thicknesses. As can be seen from the examples above the reduction is generally even less than this two-thirds value. Since polytetrafluoroethylene is available commercially and articles therefrom are most satisfactory and since the production of copolymers leads to products having properties more like the thermoplastics, this invention is concerned mainly with polytetrafluoroethylene.

The rolls are placed together or separated to the extent desired as judged by simple measurement of the webs being produced. Adjustment of the clearance between the rolls is readily made by the conventional means, not shown, by the operator during the running if necessary, but generally the initial adjustment needed is calculated very accurately and little or no adjustment of the rolls is needed in the running. The rolls or whatever pressure elements used may be heated to some extent, if desired, but it is better not to heat. The polytetrafluoroethylene must be unsintered prior to converging. The sintering is effected in the subsequent heating step. This affords greater control to the entire process, higher production speeds and lower costs.

While the assemblies can be used in units, the process of this invention may be used to produce single coated articles. The assembly is passed to a cutter, not shown, where it is cut into smaller sections or into singles. It is also possible to effect the separation into singles by exerting sufficient pressure on the rolls so that the web, that is, the sections between the coated articles, almost or entirely disappears. The plurality of articles emerge with little or no membrane polymer and they are easily separated. When assemblies are to be produced, the pressure used will be adjusted to get the desired web thickness. Using contoured pressure surfaces for economy purposes, one can readily produce assemblies in which the web or membrane portions have a thickness less than twice the coating thickness in those instances where wires or the like are used in filling the tubes or, in those instances in which the tube is not filled, less than twice the initial thickness, these values being approximately equal. It is preferred to compress to a thickness which is not greater than two-thirds the combined thicknesses of the sheets.

The heating time need only be long enough to effect the sintering of the polymer. This will depend upon the size of the oven being used, the amount of coated material being sintered, the type of heat and the speed of the traveling coated article. While batch sintering can be used, it is preferred to conduct the sintering on a continuous basis. Usually, the time is in the order of only a few seconds but it may be as high as 30 minutes or higher. All that is usually required is sufficient time to get the body heated to the sintering point of the polymer. In this heating one will avoid thermally or otherwise degrading the polymer. This is readily done, for at high temperatures heating times are short. Further, particularly effective kinds of heating, such as radiant heating, may be employed.

As noted above a variety of articles may be produced by this invention. While it is preferred to produce symmetrical objects, the hollow portion of the article produced may be in the form of slots, circular or cylindrical, square, hexagonal, diamond and other shapes. Mandrels, when used, can have similar shapes. Furthermore, the various articles can be readily produced in a continuous fashion.

By this invention electrical conductors are readily encapsulated in a sheath of plastic material. High-quality sheaths can be produced under controlled conditions. For example, it is possible to produce structures hitherto not feasible and to manufacture from polytetrafluoroethylene objects that could not be made before, yet retaining the chemical inertness, dielectric and other desirable properties of the resin. Further, the weight of insulation is minimized. This is important, for example, in aircraft and missile wiring in which thin, high-quality wiring is most essential. Such objects having no electrical flaws are produced by this invention. These desirable articles are made efficiently and economically.

Because of the outstanding resistences to chemicals that the tetrafluoroethylene polymers have and particularly polytetrafluoroethylene, this invention is particularly of value in the production of containers for holding corrosive materials. For example, containers can be made by this invention for storing concentrated acids, as, for example, fuming nitric acid, hot liquids and other hot, corrosive or poisonous materials.

The various tubes and containers of this invention of tetrafluoroethylene resin have not been known hitherto-fore. They are very useful for slip over electrical insulations, containers for chemicals and protective coverings for objects of all kinds. They are very tough and flexible, being so at extremely low temperatures and being so at temperatures above 300° C. They are resistant to moisture, to degradation by light, ultraviolet radiation or to heat and only but a very few rare chemicals can attack the articles.

Pressing unsintered sheets of polytetrafluoroethylene together to form tight, homogeneous bonds is used to advantage to form tubular structures and, in other instances, to bond the polymer around a non-shrinkable member, such as a wire. In the latter instance, sintering can effect shrinkage at the base forming a necked-down section. Such sections on adjacent wires and the space therebetween form grooves or receptacles for receiving similarly coated wires in interlocking fashion. Thus, this invention affords a wide variety of products.

The ease and uniformity with which the articles may be made permits their ready entry on a competitive basis into existing container and covering markets. In fact, the outstanding properties of the structures of this invention places them in preferable positions in these markets.

While the invention has been disclosed herein in connection with certain embodiments and certain procedural details, it is clear that changes, modifications or equivalents can be used by those skilled in the art; accordingly, such changes within the principles of this invention are intended to be included within the scope of the claims below.

I claim:

1. As a new article of manufacture, an assembly made of unsintered tetrafluoroethylene resin and mainly in sheet form having near one edge a plurality of tubes extending upwardly from the flat plane of the sheet, having at the parallel edge opposite said first edge but on the opposite side of said sheet at least one tube extending downwardly from the plane of the sheet, and in each of the said tubes means for stiffening and filling said tubes, the said tubes on the one side being adapted to be brought into intermeshing and locking relationship with the said tubes on the other side to convert the said assembly into a new tubular structure.

2. An article in accordance with claim 1 in which the said resin has been sintered.

3. An article in accordance with claim 1 made of polytetrafluoroethylene.

4. An article in accordance with claim 3 in which the polytetrafluoroethylene has been sintered.

5. A process for the formation of a tubate structure made of unsintered tetrafluoroethylene resin which process comprises bringing at least two surfaces of unsintered tetrafluoroethylene resin in sheet form together, each of the said surfaces having an area that can be aligned with an area on the other surface, to place one area on the long axis of one surface lying above a co-acting area on the other surface and to leave the remaining areas of the surfaces of the said sheets out of bondable contact with other surfaces, the said surfaces being brought together in the nip of pressure rolls having therein aligned pressure ridges separated by a recess, said ridges being adapted to receive said over-lying sections for bonding and said recess being adapted to receive said surfaces to be kept free of pressure and said recess containing a guide around which said surfaces pass, said guide forcing resin outwardly away from said guide toward said ridges making the walls of the resultant tubate structure conform more to the contour of said recess; forming a bond only between the said overlying sections by applying pressure thereon at room temperature to compress said layers to a thickness less than the combined initial thicknesses of the sheet material initially in said layer and by keeping those surfaces to remain unbonded in position where no external pressure can be applied during formation of said bond; removing the said pressure; and effecting closure to form said structure by placing said bonded section in sealing, closing relationship with said unpressed surfaces.

6. A process in accordance with claim 5 which includes the step of sintering the said resin in the said structure.

References Cited in the file of this patent

UNITED STATES PATENTS

| | | |
|---|---|---|
| 2,398,398 | Abbott | Apr. 16, 1946 |
| 2,731,068 | Richards | Jan. 17, 1956 |
| 2,816,356 | Hobrock | Dec. 17, 1957 |